(12) United States Patent
Cui et al.

(10) Patent No.: US 10,731,740 B1
(45) Date of Patent: Aug. 4, 2020

(54) MULTIPLE SMALL-PITCH HELICAL DRIVES IN LINEAR AND ROTARY ACTUATORS

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

( * ) Notice: Subject to any disclaimer, the term of this patent is extended or adjusted under 35 U.S.C. 154(b) by 0 days.

(21) Appl. No.: 16/786,908

(22) Filed: Feb. 10, 2020

(51) Int. Cl.
*F16H 25/24* (2006.01)
*F16H 25/22* (2006.01)
*F16H 25/20* (2006.01)

(52) U.S. Cl.
CPC ......... *F16H 25/24* (2013.01); *F16H 25/2261* (2013.01); *F16H 2025/2053* (2013.01); *F16H 2025/2087* (2013.01)

(58) Field of Classification Search
CPC ................. F16H 25/24; F16H 25/2261; F16H 2025/2053; F16H 2025/2087
See application file for complete search history.

(56) References Cited

U.S. PATENT DOCUMENTS

| | | | | |
|---|---|---|---|---|
| 3,173,304 A | * | 3/1965 | Strandgren | F16H 25/2252 74/424.93 |
| 3,406,584 A | * | 10/1968 | Roantree | F16H 25/2252 74/424.92 |
| 3,595,094 A | * | 7/1971 | Lemor | F16H 25/2252 74/89.14 |
| 3,726,151 A | * | 4/1973 | Lemor | F16H 25/2006 74/424.92 |
| 3,884,090 A | * | 5/1975 | Dock | F16H 25/2006 74/424.92 |
| 4,048,867 A | | 9/1977 | Saari | |
| 4,526,053 A | | 7/1985 | Carson | |
| 4,964,314 A | * | 10/1990 | Wilkes | F16H 25/2252 74/424.92 |
| 6,026,696 A | * | 2/2000 | Hehl | B29C 45/07 74/411 |

(Continued)

FOREIGN PATENT DOCUMENTS

| | | |
|---|---|---|
| CA | 1058909 A | 7/1979 |
| JP | 54133239 A | 10/1979 |

*Primary Examiner* — David M Fenstermacher
(74) *Attorney, Agent, or Firm* — Richard C. Litman; Nath, Goldberg & Meyer

(57) ABSTRACT

The multiple small pitch helical drives in linear and rotary actuators uses a plurality of small pitch helical screws in place of a single large pitch lead screw to provide increased power or force in a linear actuator or increased torque in a rotary actuator. The multiple small pitch helical drive includes a plurality of screws disposed between a base panel and a rear panel in a rigid skeleton, the screws having a single degree of freedom, i.e., they are free to rotate, but cannot move axially. A piston head having spaced disks includes floating nuts disposed in sockets on the disks for each of the screws, the piston head being free to travel on the screws between the base panel and the rear panel as the screws are rotated. The helical pitch reduction provided results in increased force output and increased torque for linear and rotary actuators.

15 Claims, 9 Drawing Sheets

(56) References Cited

U.S. PATENT DOCUMENTS

| | | | |
|---|---|---|---|
| 8,020,463 B2* | 9/2011 | Kinoshita | ............ F16H 25/2252 |
| | | | 74/424.92 |
| 8,037,606 B2 | 10/2011 | Nakamura | |
| 2004/0031341 A1* | 2/2004 | Benoit | ................ F16H 25/2252 |
| | | | 74/89.34 |
| 2004/0082431 A1* | 4/2004 | Maydew | ................. B64C 13/34 |
| | | | 475/331 |
| 2007/0238571 A1* | 10/2007 | Sugitani | .................. F16H 57/12 |
| | | | 475/227 |
| 2008/0196529 A1* | 8/2008 | Sugitani | .............. F16H 25/2252 |
| | | | 74/424.89 |
| 2009/0288509 A1 | 11/2009 | Hori et al. | |
| 2010/0170077 A1* | 7/2010 | Kinoshita | ............... F16H 25/20 |
| | | | 29/466 |
| 2014/0345138 A1 | 11/2014 | Kinoshita et al. | |

* cited by examiner

MULTIPLE SMALL-PITCH HELICAL DRIVES IN LINEAR AND ROTARY ACTUATORS

BACKGROUND

1. Field

The present disclosure relates to linear and rotary actuators, and particularly to multiple small pitch helical drives in linear and rotary actuators to increase the output force of linear actuators or the torque output of rotary actuators for handling heavy duty tasks.

2. Description of the Related Art

Actuation to linear motion or rotational motion is commonly achieved by directly using easily available power to rotate a lever or a unitary thread screw. This is distinguishable from actuation by use of power other than the converted power, such as electrical to fluid, or mechanical to fluid. In real-world projects, engineers often still prefer fluid linear actuators, such as a hydraulic cylinder and piston, since fluid actuators generate a far greater force over that of electrical linear actuators. In a typical configuration, an electric linear actuator uses a single helical screw in large diameter to enhance the buckling strength. As is well known, the larger the base diameter the helical thread has, the larger the pitch height of the thread. As the power, $P=F\times Distance$ is fixed for the power source, the travelling distance, or the pitch height in the case will negatively affect the output force. This is likely a fundamental reason that, in practice, non-fluid screw linear actuators tend to have low output force compared to fluid linear actuators.

Hence, there is a need for a new drive system for non-fluid actuators to provide more output force for linear actuators and more torque for rotary actuators. Thus, multiple small-pitch helical drives in linear and rotary actuators solving the aforementioned problems are desired.

SUMMARY

The multiple small pitch helical drives in linear and rotary actuators uses a plurality of small pitch helical screws in place of a single large pitch lead screw to provide increased power or force in a linear actuator or increased torque in a rotary actuator. The multiple small pitch helical drive includes a plurality of screws disposed between a base panel and a rear panel in a rigid skeleton, the screws having a single degree of freedom, i.e., they are free to rotate, but cannot move axially. A piston head having spaced disks includes floating nuts disposed in sockets on the disks for each of the screws, the piston head being free to travel on the screws between the base panel and the rear panel as the screws are rotated. In one embodiment, a shaft is fixed to the periphery of the spaced disks of the piston head, the shaft being extendible and retractable in a barrel housing the multiple small pitch helical drive assembly, forming a linear actuator. In another embodiment, the piston has a body having large pitch helical threads, which engage corresponding internal threads of an output sleeve rotatable around the multiple small pitch helical drives assembly, forming a rotary actuator. As the piston moves linearly, the piston drives rotation of the output sleeve. In a third embodiment, the piston has a shaft on which an auxiliary sleeve is mounted, the auxiliary sleeve having both large pitch internal threads and large pitch external threads. An output sleeve is rotatably mounted over the auxiliary sleeve, the output sleeve having rollers extending radially inward to engage the external threads of the auxiliary sleeve. The barrel also has large pitch external threads disposed thereon, which engage the internal threads of the auxiliary sleeve as the piston extends and retracts.

The screws of the multiple small pitch helical drive assembly are driven to rotate synchronously at the same speed and in the same direction by any suitable mechanism. For example, in the linear actuator, the heads of the screws may extend through the base panel and have spur gears mounted thereon, including a central screw having a central drive gear surrounded by a plurality of driven gears that mesh with the central drive gear. The central gear may be driven to rotate by any source of rotation, which may be electrical, hydraulic, or even manual.

Alternatively, in the first rotary actuator, the heads of the screws may extend through the base panel and have crank heads mounted thereon, each crank head having a screw attached centrally thereto and an eccentric crank pin or crank roller extending from the opposite side of the crank head. A shaker plate having a plurality of apertures defined therein is placed over the crank heads, the shaker plate having a central annular flange extending therefrom opposite the crank heads. A power acting disk having an eccentric recess defined therein may be placed over the shaker plate's annular flange. The power acting disk may be driven to rotate by any source of rotation, which may be electrical, hydraulic, or even manual, driving the screws to rotate synchronously at the same speed and in the same direction.

The multiple small pitch helical drive provides helical pitch reduction to gain large force for the linear actuator and large torque for the rotary actuator.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multiple small pitch helical drives in linear and rotary actuators uses a plurality of small pitch helical screws in place of a single large pitch lead screw to provide increased power or force in a linear actuator or increased torque in a rotary actuator. The multiple small pitch helical drive includes a plurality of screws disposed between a base panel and a rear panel in a rigid skeleton, the screws having a single degree of freedom, i.e., they are free to rotate, but cannot move axially. A piston head having spaced disks includes floating nuts disposed in sockets on the disks for each of the screws, the piston head being free to travel on the screws between the base panel and the rear panel as the screws are rotated.

The linear actuator contains two fundamental sub-assemblies, a barrel and a piston, with a continuous rotation input end. These two subs-assemblies are coaxial, and in relative and reciprocal movement, as in conventional linear actuators.

Figure 1A:
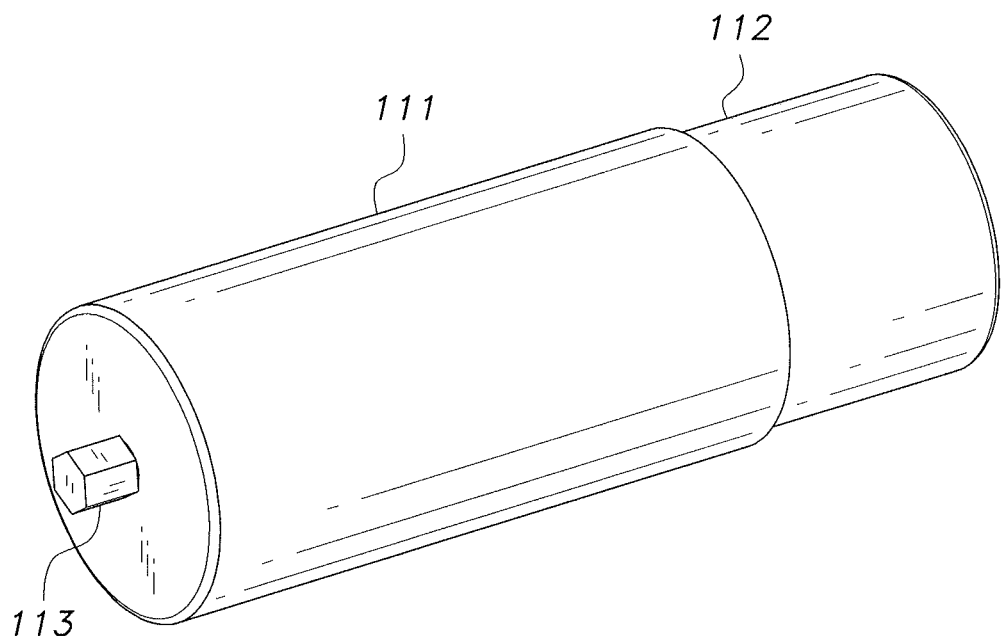
FIG. 1A is a perspective view of a linear actuator incorporating the multiple small pitch helical drives in linear and rotary actuators.

Referring to FIG. 1A, the linear actuator includes a barrel 111 (or cylinder) and a piston 112 extendable from and retractable into the barrel. A coupler 113 adapted for attachment to source of rotation extends from the barrel 111. The coupler 113 may be driven to rotate by any source of rotation, which may be electrical, hydraulic, or even manual. The coupler 113 is shown in FIGS. 1A, 1B and 2 as a hex drive, but can take any convenient configuration according to the specific application and design choice.

Figure 1B:
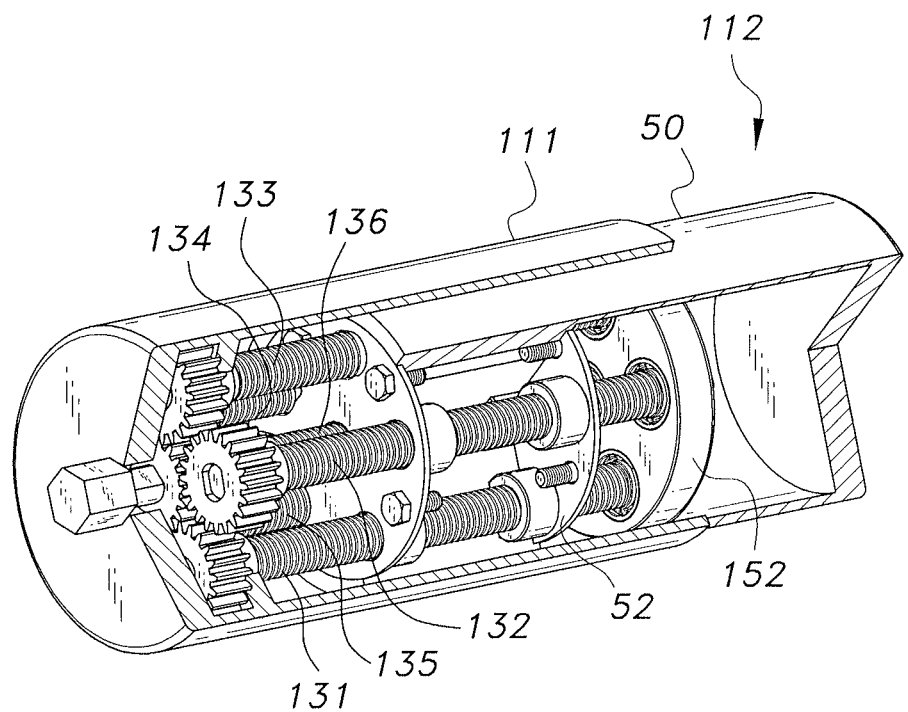
FIG. 1B is a perspective view in section of the linear actuator of FIG. 1A.
Figure 2:
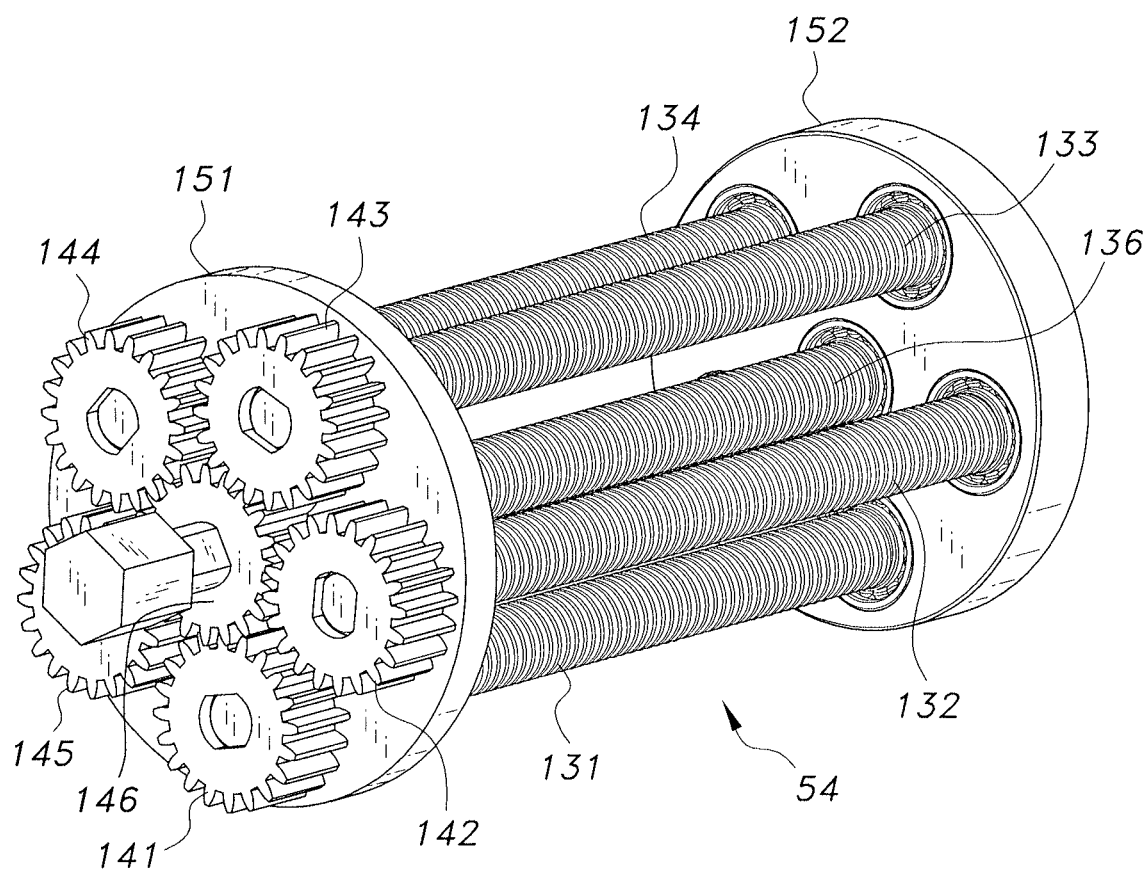
FIG. 2 is a perspective view of the multiple small pitch helical drive assembly disposed in the barrel of the linear actuator of FIG. 1A.

As shown in FIG. 1B, the piston 112 of the linear actuator includes a shaft 50 attached to a piston head 52. The piston head 52 travels on a plurality of small pitch helical screws as the screws rotate to extend or retract the shaft 50 of the piston 112. The small pitch helical drive assembly 54 is shown in more detail in FIG. 2. The small pitch helical dive assembly 54 includes a base panel 151 and a rear panel 152. In the embodiment shown in FIGS. 1B and 2, the drive assembly includes six helical screw drive members 131-136 extending between the base panel 151 and the rear panel 152, including a center helical screw drive member 136 and five helical screw drive members 131-135 radially spaced about the center screw drive member 136. The center screw drive member 136 has a head end extending through the base panel 151 and fixed to coupler 113 for rotation therewith. A drive gear 146 is mounted on the head end of the center screw drive member 136 outside the base plate 151. Gears 141-145 are attached to the head ends of screw members 131-135, respectively, and are driven by drive gear 146 to rotate helical drive members 131-135.

As the drive gear 146 rotates, e.g., in a clockwise direction, the driven gears 242-145 are driven to rotate in the opposite direction, e.g., counterclockwise. Since the linkage by gears 141-146 changes the direction of rotation, the center screw drive member 136 is oppositely threaded from circumferential screw drive members 131-135. For example, screw drive member 136 may have left-hand threads, and circumferential screw drive members 131-135 may have right-hand threads so that the helical threads rotate in the same direction. The gearing is such that screw drive members 131-136 rotate at identical speeds. The shaft ends of the helical screw drive members 131-136 freely rotate in wells or bearings in the rear panel 152. The helical screw drive members 131-136 are axially constrained so that they cannot extend axially beyond rear panel 152, but are free to rotate. The helical screw drive members 131-136 are selected so that they have a small pitch as compared to the single lead screws found in conventional linear actuators. The smaller pitch gives the helical drives a greater mechanical advantage than large pitch lead screws, and therefore enables the present linear actuator to deliver greater power and force for heavy duty applications.

Figure 3A:
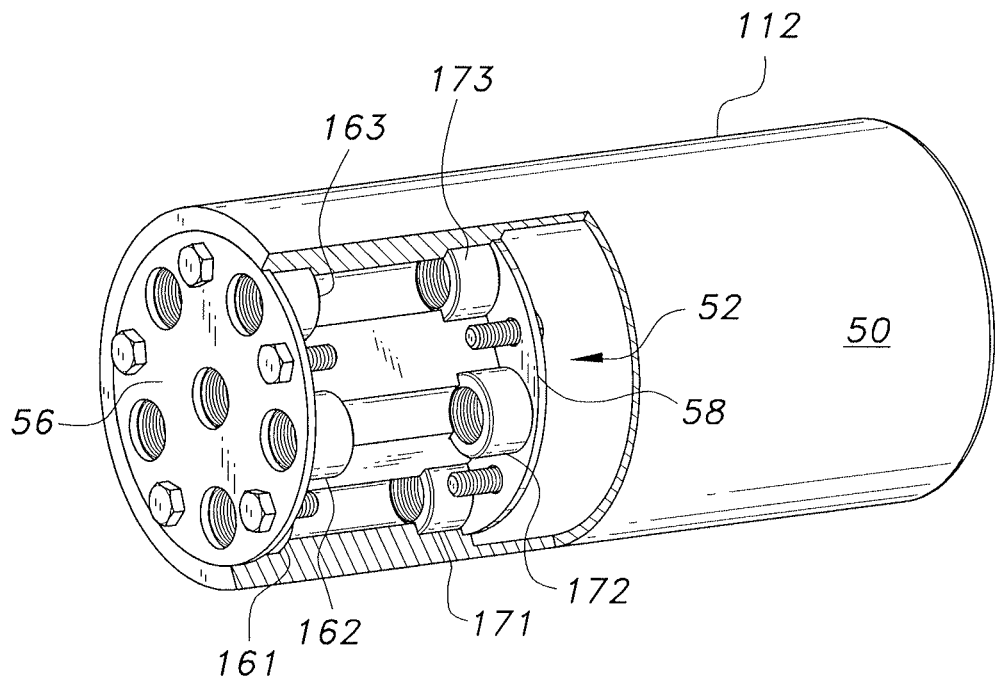
FIG. 3A is a perspective view of the piston of the linear actuator of FIG. 1A, shown with the shaft broken away and partially in section to show the piston head.
Figure 3B:
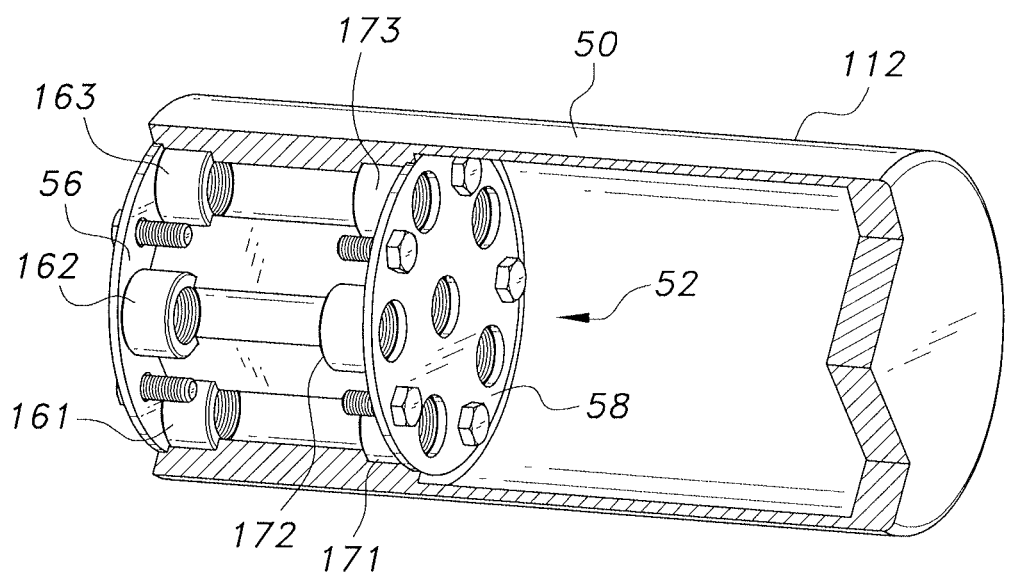
FIG. 3B is a perspective view of the piston of the linear actuator of FIG. 1A, shown with the shaft broken away and partially in section to show the piston head from the opposite end from FIG. 3A.

FIGS. 3A and 3B show different view of the piston 112 for the linear actuator. The piston 112 includes a piston shaft 50 attached to a piston head 52. The piston head 52 includes spaced apart end disks 56, 58. Each end disk 56, 58 includes a plurality of sockets (e.g., end disk 56 is shown with exemplary sockets 161, 162, and 163 and end disks 58 is shown with exemplary sockets 171, 172, and 173) corresponding in number to the small pitch helical screw drives 131-136, the sockets having "floating nuts" disposed therein, so that the helical screw drives 131-136 are free to rotate through the end disks. Thus, the multiple screw bars 131-136 drive smoothly, with no obstruction, through the mating nuts "floating" in each of the sockets. In each socket, a relative freedom of rotation female nut settles in, but the movement along its axis is constrained by the end disk. The piston head 52 that allows all female nuts settling in each corresponding sockets a relative freedom of the rotation adjusts for the inevitable existence of manufacturing error, and all thread dimension tolerances will be momentarily self-aligned, balanced and adjusted by each of the relatively floating nuts to synchronize all helical bars to push the piston 112 moving forward. Rotation of the screw drives 131-136 in one direction causes the piston head 52 to travel on the helical drives 131-136 to extend the shaft 50, while rotation in the opposite direction causes the shaft 50 to retract in the barrel 111.

By using multiple screw drive members 131-136, the force applied is distributed across the threaded parts of the multiple screw drive members, rather than being limited to the force which a single screw drive member would be able to transfer through its threads. This arrangement adds stability in that the multiple screw drive members 131-136 provide support against axial bending, and also allows the force of extension to be divided among the multiple screw drive members 131-136.

The multiple small pitch helical drive assembly may also be used in rotary actuators. In general, a rotary actuator converts linear motion of a piston into rotary movement or rotational output. The rotary actuator may contain a stationary base and have a similar small-pitch screw skeleton structure as in the first configuration (the linear actuator described above). In a first rotary actuator embodiment, the piston head may be provided with a rotatable sleeve carrying a large torque rotation as the output, with all other components being housed inside a base. In this configuration, the piston head's outer surface includes large-pitch helical threads for rotating an outer sleeve as the piston head is driven back and forth by the multiple small pitch helical drive assembly.

Figure 4:
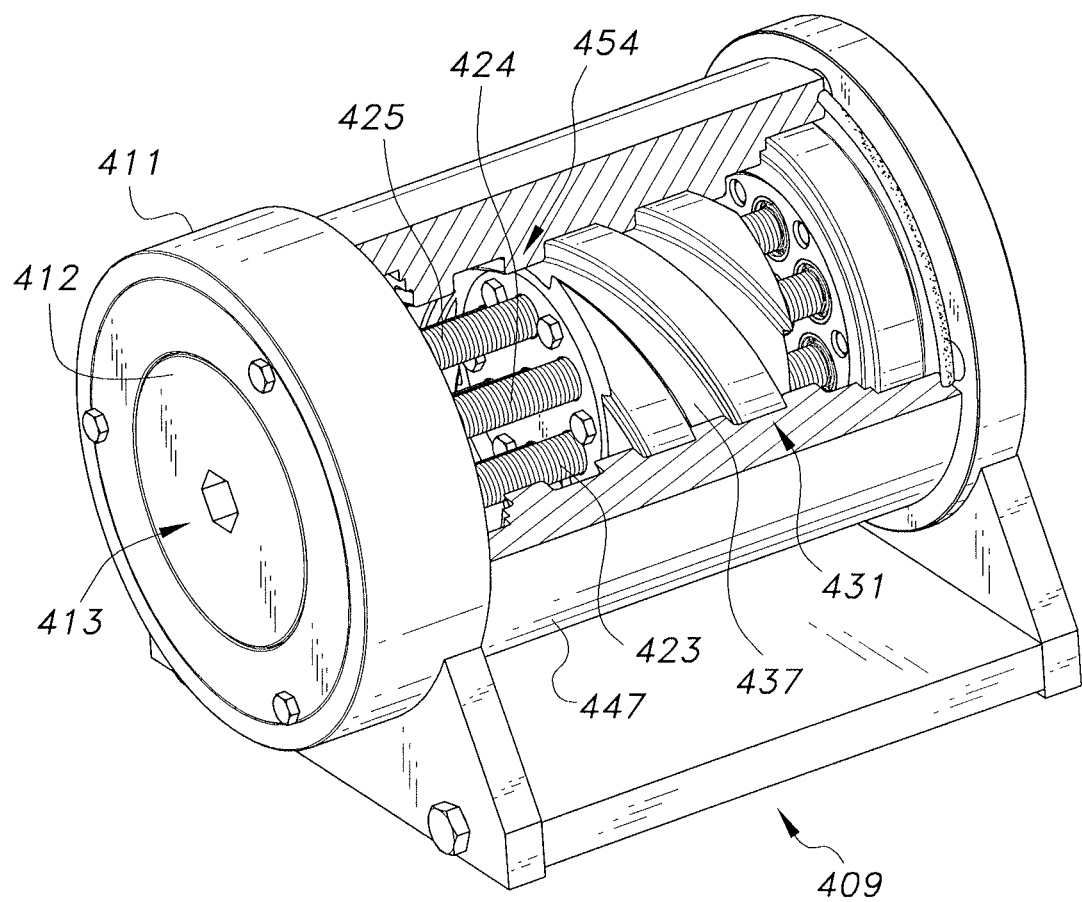
FIG. 4 is a perspective view of an embodiment of a rotary actuator incorporating a multiple small pitch helical drive assembly similar to FIG. 2, shown with the output sleeve broken away and partially in section to show details thereof.

As shown in FIG. 4, in this embodiment, a rotary actuator may have a plurality of parallel helix drive members and piston head driving an outside rotatable sleeve. The rotary actuator may have a benchtop stand 409, which provides a stationary base. The actuator housing is mounted on the stand 409, the housing including an input frame 411 in which an power acting disk 412 is rotatably mounted, the power acting disk 412 having a boss 413 defined therein adapted for attachment to an external source of rotation. The external source of rotation may be electrical, hydraulic, or even manual. Inside the housing is a multiple small pitch helical drive assembly 454, substantially the same as the assembly 54 shown in FIG. 2 and described above. Same as the linear actuator embodiment, the small-pitch screw skeleton is structured between the base panel and rear panel, and both stationary panels have the same socket locations distributed in a pattern, so that any screw bar between them will be installed in parallel properly. The power acting disk 413 drives the multiple small pitch helical drive assembly 454 by an eccentric drive mechanism, described below. A piston head 431, shown in greater detail in FIG. 5, travels linearly on drive members 423, 424, 425 (and other helical drive members, hidden in the perspective view of FIG. 4) when driven by a rotational source attached to input boss 413. Piston head 431 has end disks 433, 434 and a circumferential body 437 having large pitch helical threads disposed thereon.

An output sleeve 447 is positioned around the multiple small pitch helical drives assembly 454 and has internal threads, which engage the external helical threads on the body 437 of the piston head 431. The output sleeve 447 is axially fixed between the end plates of the actuator housing, and therefore cannot move in the axial direction (beyond bearing lash). Therefore, linear movement of the piston head 431 causes the output sleeve 447 to rotate according to the linear movement of the piston head 431, as translated through the external threads on the piston body 437.

As with the linear actuator of FIGS. 1A-3B, the rotary actuator uses multiple screw drive members (or at least one small pitch helical drive member), as described above, but uses linear movement of the piston head 431 having a piston body 437 with a large pitch helical outer diameter. The large pitch helical outer diameter, in turn, drives the output sleeve 447 sleeve to rotate. The helical pitch reduction provided by the small pitch helical drive assembly relative to the large pitch helical threads on the outer surface of the piston body 437 and the mating internal threads of the output sleeve results in a large output torque.

Figure 6A:
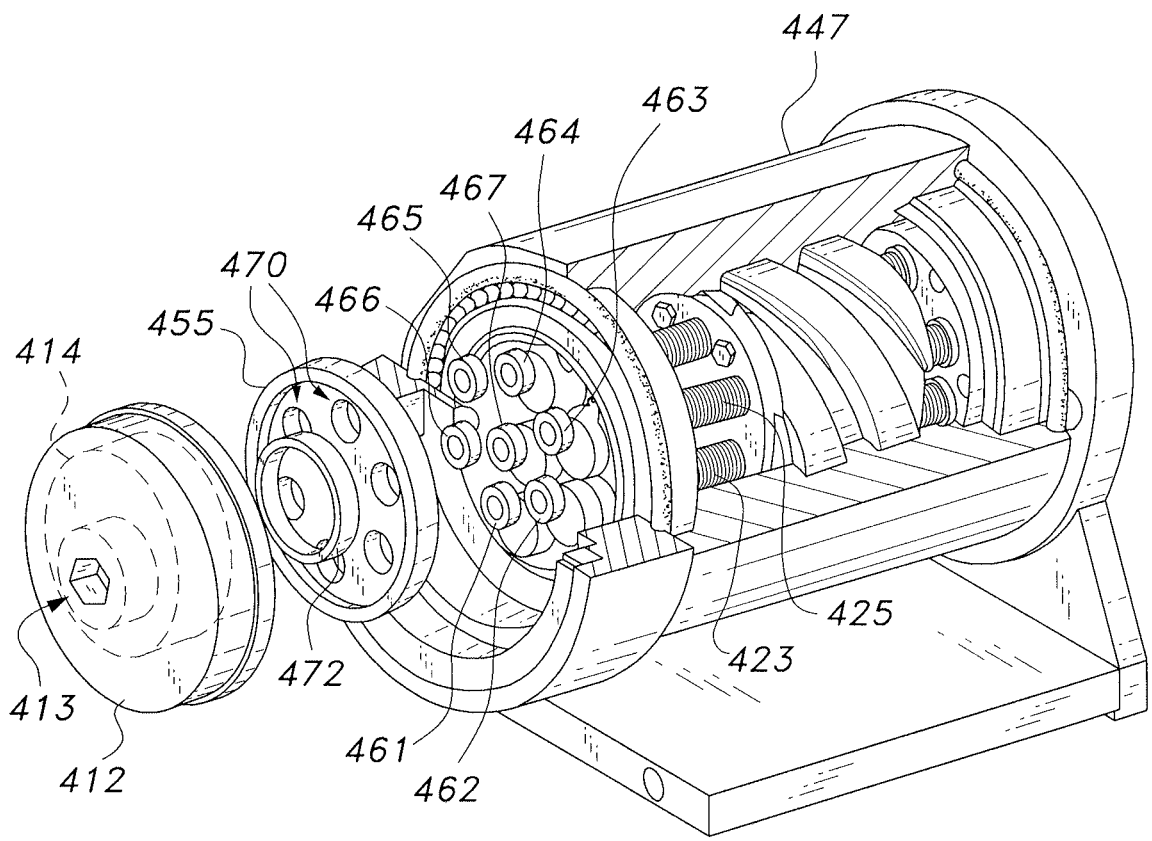
FIG. 6A is a partially exploded perspective view of the rotary actuator of FIG. 4, shown with the output sleeve broken away and partially in section.
Figure 6B:
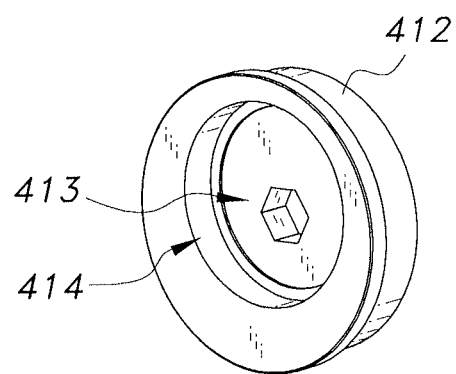
FIG. 6B is a rear perspective view of the power acting disk of the rotary actuator of FIG. 4.
Figure 7:
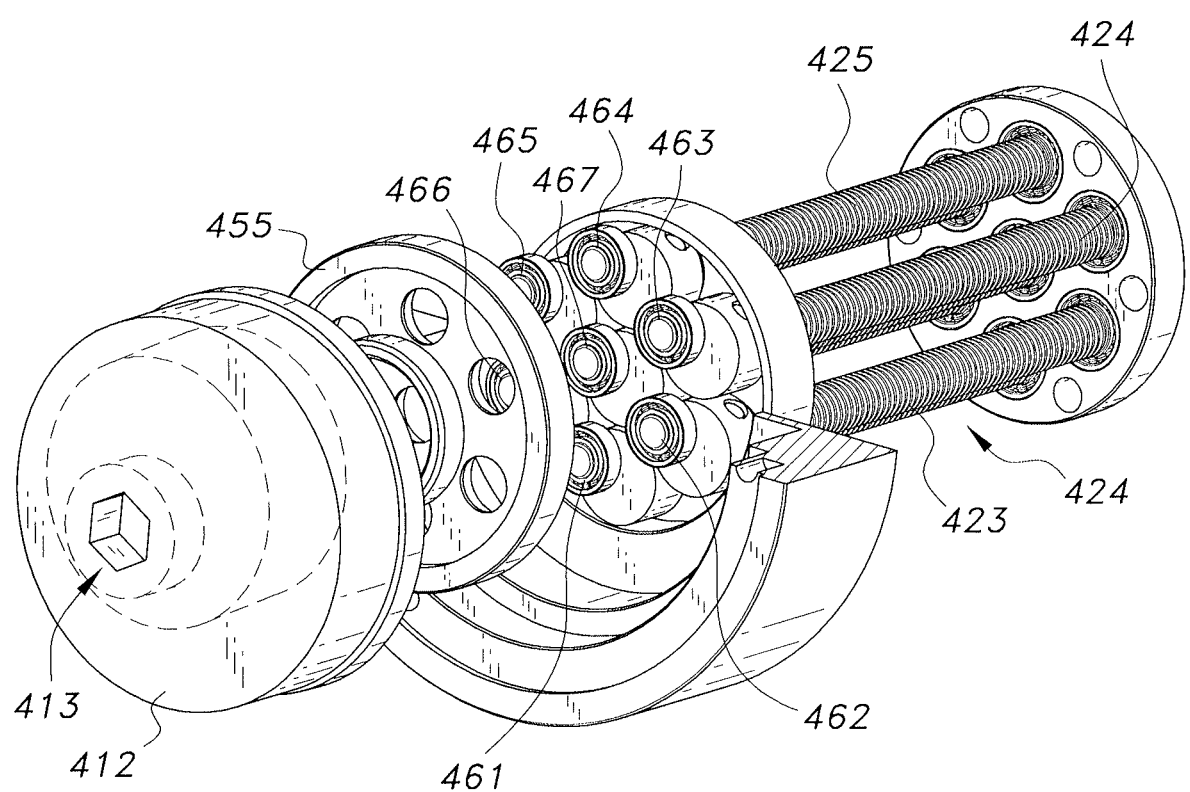
FIG. 7 is a partially exploded perspective view of the multiple small pitch helical drive assembly of the rotary actuator of FIG. 4, showing details of the crank heads attached to the screws and of the shaker plate.

In this embodiment, the power acting disk 412 may drive an eccentric drive connection to drive the helical screw drive members. All gears on the single screw bar in the linear actuator are replaced by identical crank heads in this embodiment. Each crank head has a pair of offset axes. The center axis is coaxial with the axis of each small-screw bar. Since the screw drive members are not coupled with gears, the small pitch helical screw drive members are driven to rotate in the same direction, as controlled by the power acting disk 412, a shaker panel 455, and drive crank heads 461-466, as shown in FIGS. 6A and 6B. As shown in FIG. 6B, the power acting disk 412 is a circular disk having an eccentric recess 414 defined in its rear face. As shown in FIG. 7, the head of each helical drive 423-435 has a corresponding crank head 458 mounted thereon, the head of each helical drive 423-425 being fixed to the center of its corresponding crank head 458. Each crank head 458 has an eccentrically mounted crank pin or crank roller 461-467 extending toward the power acting disk 412. The shaker panel 455 is intermediate the small pitch helical drive assembly 454 and the power acting disk 412. The shaker panel 455 has absolutely the same socket locations as the base and rear panels. Now, inserting all sockets 470 of the shaker panel 455 into the offset axis (crank pin) of the crank head 461-467 accordingly, moving the shaker panel 455 all the way around will result in all small-pitch screw bars simultaneously turning around accordingly at the same speed. As matter of the fact, the base panel, all crank heads and the shaker panel form a rigid and one degree of freedom "parallelism 4-bar linkage system" in series. Moving any linkage or crank of the system will result in the responding movements of all other components of the system. Introducing the power acting disk 412, which also has the crank offset circle 414 reversely covering the shaker panel 455, will result in the rotation of the power acting disk 412 turning the shaker panel 455 to cause all the crank heads and screw bars to rotate passively. The screw bars rotation will push the piston head moving thru the relative rotation free nuts 415 disposed in the piston head 431. As the piston head 43' moves, the multiple large helical threads will force the output sleeve 447 to rotate as the output. Theoretically, this is the one stage of helical-pitch rotation reduction system. Using small helical-pitch reduces the input rotation to gain large torque. The shaker panel 455 has a plurality of sockets 470 defined therein, which receive the crank pins or crank rollers 461-467. The shaker panel 455 also has an annular flange 472 extending from its front face, the annular flange 472 being inserted into the eccentric recess 414 defined in the rear face of the power acting disk 412.

Figure 5:
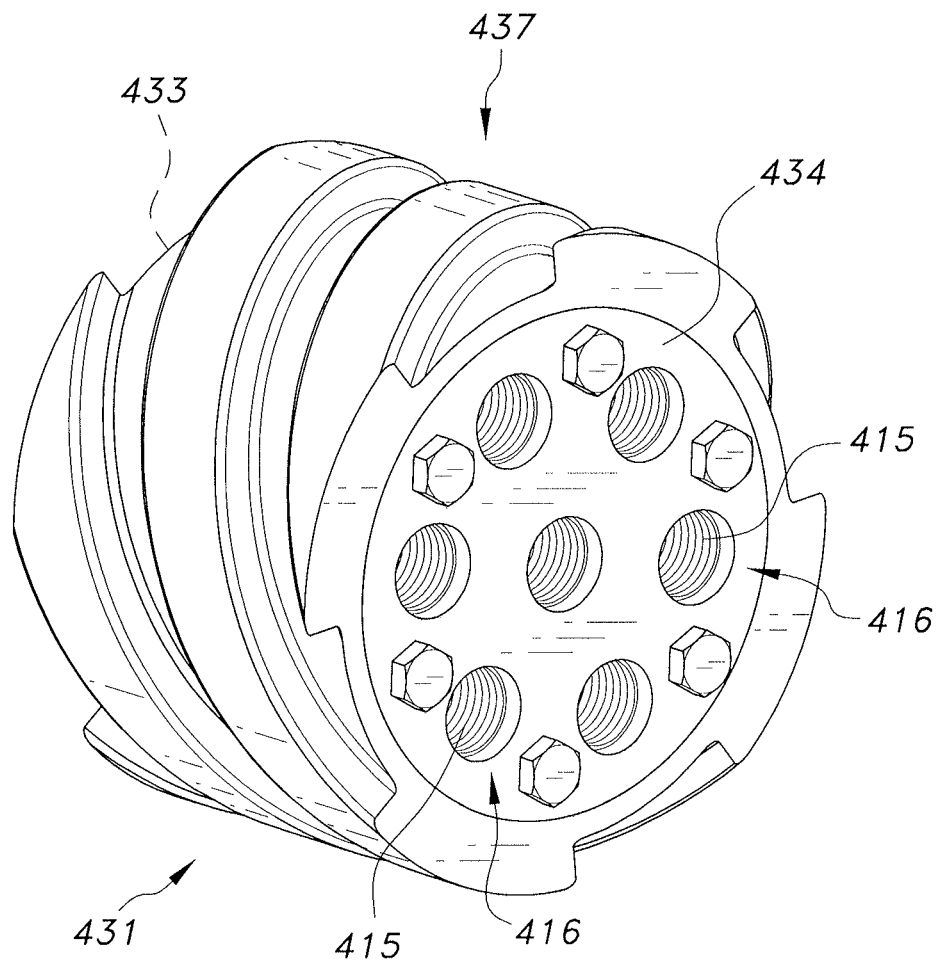
FIG. 5 is a perspective view of the piston head of the rotary actuator of FIG. 4.

Thus, the shaker panel 455 has a plurality of sockets 470 defined therein, which receive the crank pins or crank rollers 461-467. The shaker panel 455 also has an annular flange 472 extending from its front face, the annular flange 472 being inserted into the eccentric recess 414 defined in the rear face of the power acting disk 412. When the power acting disk 412 is rotated by an external source of rotation, the annular flange 472 rides in the recess 414, following the eccentric path defined by the wall of the recess 414, causing the shaker panel 455 to rotate in an eccentric manner, the crank pins or crank rollers 461-467 following to cause the helical drive members 423-425 to rotate at the same speed and in the same direction (as shown in FIG. 5, the drawings depict a helical drive assembly 454 having seven helical drives; however, the number of helical drives may be dictated by the required torque output and specifications of the components, at least one small pitch helical drive being sufficient in some circumstances.).

Different from the piston head 52 in the linear actuator, the piston head 431 has no extensive portion (shaft) to carry the force, but it carries multiple large-pitch helical threads over the outer surface of the piston body 437 for large torque conversion. The piston head 431 in this embodiment reserves the unique property of the piston head 52 of the linear actuator that the piston head 431 allows all female nuts 415 settling in each corresponding socket 416 a relative freedom of rotation. The inevitable existence of manufacturing error and all thread dimension tolerances will be momentarily self-aligned, balanced, compensated, and adjusted by each of the relatively floating nuts 415 to synchronize all helical bar efforts to push the piston moving forward. As the piston head is moving in linear motion pushed by multiple (or at least one) small-pitch screws, the multiple large-pitch helical on the piston head 431 will force the mating helical threads of the output sleeve 447 to rotate as the output with enlarged heavy duty torque.

In another embodiment, a rotary actuator may use the linear actuator of FIGS. 1A-3B, or any conventional linear actuator, such as existing fluid cylinders, to drive a rotary actuator in two stages. By doing so, a short travelling distance with large rotation actuation will be obtained. In this configuration, an internal sleeve includes large-pitch helical threads on its internal and external surfaces to provide a final rotation of the outer sleeve that is the sum of the two relative rotations in two stages along the same linear displacement.

Figure 8:
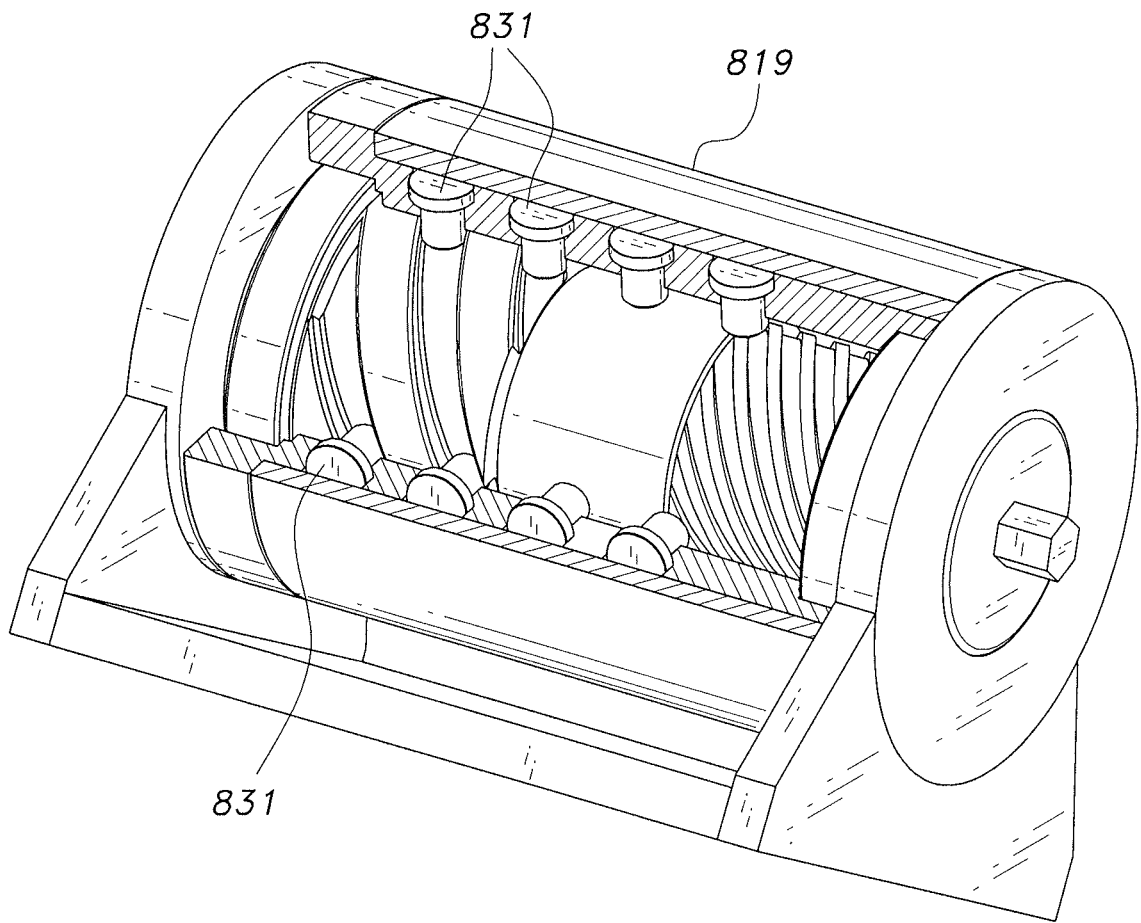
FIG. 8 is a perspective view of another embodiment of a rotary actuator, shown with the output sleeve broken away and partially in section to show details thereof.
Figure 9:
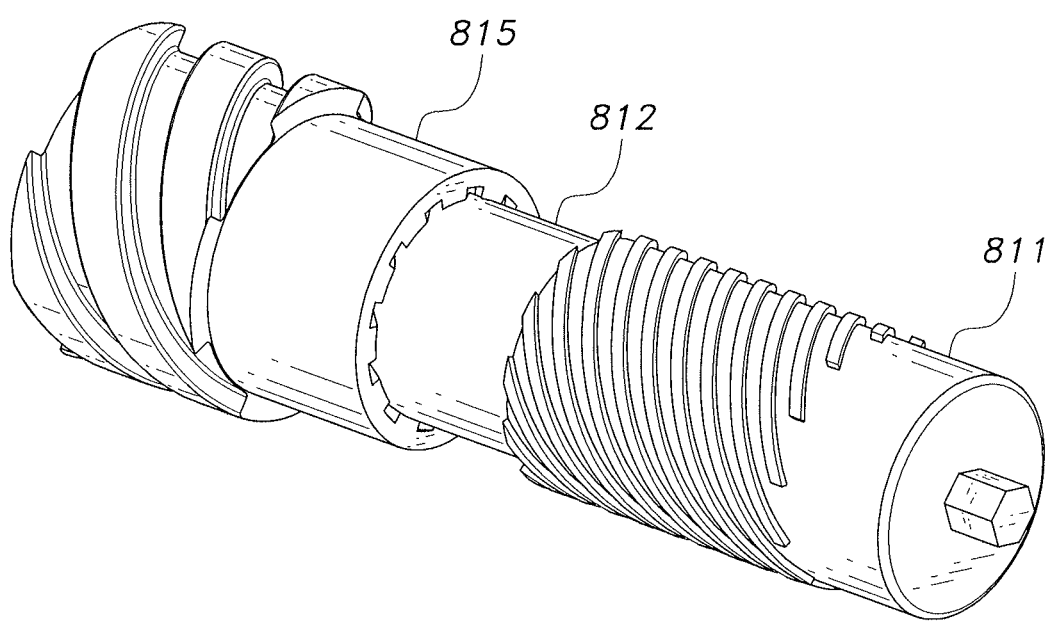
FIG. 9 is a perspective view of a barrel and piston assembly used in the rotary actuator of FIG. 8.

FIG. 8 shows a barrel 811 and a piston 812 axially slidable in the barrel 811. Disposed on the barrel 811 is an auxiliary sleeve 815, which functions as an intermediary sleeve. The auxiliary sleeve 315 has both large pitch external thread and large pitch internal threads. An output sleeve 819 is mounted on the outside of the auxiliary sleeve 815.

The barrel 811 and the piston 812 operate in a similar fashion as the linear actuator of FIGS. 1A-3B. The barrel 811 also has a set of large pitch helical threads on its outer surface.

The external threads on the barrel 811 engage the internal threads of the auxiliary sleeve 815. As the small pitch helical drive assembly inside the barrel 811 causes linear actuation of the piston 812, the auxiliary sleeve 815 is caused to move linearly. Output sleeve 819 is constrained axially, but is able to rotate. Rollers 831 mounted inside the output sleeve 819 engage the external threads of the auxiliary sleeve 815, which causes the output sleeve 819 to rotate. By forming the multiple large helical threads on the outer surface of the barrel 811 of the linear actuator, and adding the auxiliary sleeve 815 having the multiple internal and external large helical threads, output sleeve 819 is able to move with one degree freedom relative rotation with respect to the piston 812.

The outer threads on the auxiliary sleeve 815 engage the rollers 831, and the rollers 831 are linearly aligned along a center axis of the output sleeve 819. The output sleeve 819 is installed on the stationary base with one degree of freedom to allow relative rotation. Rollers 831 are spaced equally in pitch, divided by number of the helical threads distributed in the auxiliary sleeve 315 along the sleeve axis.

Using rollers 831 reduces the difficulties and cost of fabricating female helical threads, as well as reducing friction. In this configuration, as the piston 812 travels, the auxiliary sleeve 815 is forced to rotate on the barrel 811 by its internal helical threads engaging the external threads on the barrel 811. The rotation of the auxiliary sleeve 815 results in rotation of the output sleeve 819. The final rotation is the sum of two relative rotations in two stages along the same linear displacement, that is, the auxiliary sleeve 815 about the barrel 811, combined with the rotation of the output sleeve 819 about the auxiliary sleeve 815.

This configuration is thus a two stage helical-pitch rotation reduction system. This configuration uses a small helical pitch that reduces the input rotation to gain large torque or to achieve a large rotation angle.

It is to be understood that the multiple small pitch helical drives in linear and rotary actuators is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A linear actuator, comprising:
a barrel;
a multiple small pitch helical drive assembly housed in the barrel, the assembly having:
a base plate;
a rear plate spaced apart from the base plate;
a plurality of drive screws, each of the drive screws having a head end extending through the base plate and a shank end rotatable against the rear plate, the drive screws being parallel to each other and constrained against axial movement, but free to rotate, each of the drive screws having helical threads defining a small but appropriate pitch being capable to convert the relative rotation of the mating parts to each screws to the relative linear motion along the axis of the screws;
a gear train including a drive gear mounted on the head end of one of the drive screws and a driven gear mounted on the head end of the remaining drive screws, the drive gear engaging all of the driven gears, whereby all of the drive screws are capable of rotating simultaneously at equal speed; and
an input coupler extending from the drive gear outside the barrel, the input coupler being adapted for attachment to a source of rotation; and
a piston having:
a piston head assembly mounted on the drive screws between the base plate and the rear plate, the piston head assembly having a pair of spaced end disks, each of the spaced end disks having a plurality of sockets defining passages through the end disks and a corresponding nut disposed in each of the sockets, the sockets being equal in number to the drive screws, the nuts engaging the helical threads of the drive screws, whereby the piston head moves linearly between the base plate and the rear plate when the drive screws are rotated; and
a shaft attached to the piston head, the shaft extending from the barrel and retracting into the barrel according to direction of linear movement of the piston head.

2. The linear actuator according to claim 1, wherein:
the drive screw having the drive gear attached thereto extends centrally through the base plate; and
the drive screws having the driven gears attached thereto are radially spaced around the centrally disposed drive screw.

3. The linear actuator according to claim 1, wherein the drive screw having the drive gear attached thereto and the drive screws having the driven gears attached thereto are threaded in opposite directions, whereby the gear train and direction of the drives screw threads cooperate to simultaneously drive the drive screw threads at identical speeds in the same direction.

4. The linear actuator according to claim 1, wherein each of the nuts disposed in the sockets of the piston head end disks is constrained against the piston axial movement, but free to rotate to the corresponding socket to permit self-adjustment of harmonious engagement of the drive screws and nuts in the piston head due to thread tolerances offsets.

5. The linear actuator according to claim 1, wherein the plurality of small pitch drive screws provides helical pitch reduction to control piston moving in low speed per revolution of the drive screws and exerts large force on the shaft of the piston.

6. A rotary actuator, comprising:
a housing, the housing including an output sleeve constrained against axial movement but free to rotate, the output sleeve having internal helical threads;
a small pitch helical drive assembly housed in the barrel, the assembly having:
a base plate;

a rear plate spaced apart from the base plate;
at least one drive screw having a head end extending through the base plate and a shank end rotatable against the rear plate, the at least one drive screw being constrained against axial movement, but free to rotate, the at least one drive screw having helical threads defining a small but appropriate pitch being capable to convert the relative rotation of the mating parts to each screws to the relative linear motion along the axis of the screws;
an input drive mounted in the housing and operatively connected to the small pitch helical drive assembly, the input drive being adapted for connection to a source of rotation and configured for rotating the at least one drive screw;
a piston having:
    a piston head assembly mounted on the at least one drive screw between the base plate and the rear plate, the piston head assembly having a pair of spaced end disks, each of the spaced end disks having at least one socket defining a passage through the end disk and a corresponding nut disposed in each of the sockets, the nut engaging the helical threads of the at least one drive screw, whereby the piston head moves linearly between the base plate and the rear plate when the at least one drive screw is rotated; and
    a piston body extending around the piston head, the piston body having large but appropriate pitch helical threads being capable to convert the linear motion of the engaging and mating internal threads of the output sleeve to relative rotation; and
wherein helical pitch reduction between the small pitch of the at least one drive screw and the large pitch of the mating threads of the piston body and the output sleeve results in large output torque.

7. The rotary actuator according to claim 6, wherein:
said at least one drive screw comprises a plurality of drive screws including a center drive screw and a plurality of radial drive screws radially spaced around the center drive screw, the drive screws being parallel to each other;
said input drive is configured for rotating all of the drive screws simultaneously at the same speed and in the same direction;
the at least one socket on each of the end disks of said piston head comprises a plurality of sockets corresponding in number to the drive screws, each of the sockets having a corresponding nut disposed therein, the sockets being equal in number to the drive screws, the nuts engaging the helical threads of the drive screws, whereby the piston head moves linearly between the base plate and the rear plate when the drive screws are rotated.

8. The rotary actuator according to claim 7, wherein said input drive comprises:
a power acting disk journaled for rotation in said housing, the power acting disk having an outer face facing external to the housing and an inner face facing said small pitch helical drive assembly, the power acting disk having an input boss disposed on the outer face adapted for connection to a source of rotation and an eccentric recess defined in the inner face, the recess having a wall;
a plurality of crank heads, the head end each of said drive screw being attached centrally to a corresponding one of the crank heads, each of the crank heads having an eccentrically mounted crank pin extending towards the power acting disk; and
a shake plate disposed between the power acting disk and the plurality of crank heads, the shaker plate having a plurality of sockets defined therein, each of the crank pins being seated in a corresponding one of the sockets in the shaker plate, the shaker plate having an annular flange extending therefrom, the annular flange extending into the recess defined in the power acting disk so that when the power acting disk is rotated, the shaker plate is driven to rotate in an eccentric pattern defined by the wall of the recess, the sockets in the shaker plate rotating the crank heads and all of the attached drive screws, the drive screws being driven to rotate simultaneously at the same speed and in the same direction, producing linear movement of said piston head.

9. The rotary actuator according to claim 8, wherein the plurality of small pitch drive screws provides helical pitch reduction relative to the large pitch of the mating threads of the piston body and the output sleeve, resulting in large output torque.

10. A rotary actuator, comprising:
a linear actuator having a barrel and a piston extendable from the barrel and retractable into the barrel;
an auxiliary sleeve having both internal threads and external threads, the auxiliary sleeve being mounted on the piston shaft;
an output sleeve rotatably mounted on the auxiliary sleeve, the output sleeve having a plurality of rollers extending radially inside the output sleeve, the rollers engaging the external threads of the auxiliary sleeve; and
external threads disposed on the barrel, the internal threads of the auxiliary sleeve engaging the external threads on the barrel when the piston shaft is retracted so that the output sleeve is rotated by action of the rollers on the auxiliary sleeve and by rotation of the auxiliary sleeve on the barrel.

11. The rotary actuator according to claim 10, wherein said linear actuator further comprises a multiple small pitch helical drive assembly housed in the barrel, the assembly having:
a base plate;
a rear plate spaced apart from the base plate;
a plurality of drive screws, each of the drive screws having a head end extending through the base plate and a shank end rotatable against the rear plate, the drive screws being parallel to each other and constrained against axial movement, but free to rotate, each of the drive screws having helical threads defining a small pitch;
a gear train including a drive gear mounted on the head end of one of the drive screws and a driven gear mounted on the head end of the remaining drive screws, the drive gear engaging all of the driven gears, whereby all of the drive screws are capable of rotating simultaneously at equal speed; and
an input coupler extending from the drive gear outside the barrel, the input coupler being adapted for attachment to a source of rotation.

12. The rotary actuator according to claim 11, wherein said piston further comprises:
a piston head assembly mounted on the drive screws between the base plate and the rear plate, the piston head assembly having a pair of spaced end disks, each of the spaced end disks having a plurality of sockets defining passages through the end disks and a corresponding nut disposed in each of the sockets, the sockets being equal in number to the drive screws, the nuts engaging the helical threads of the drive screws, whereby the piston head moves linearly between the base plate and the rear plate when the drive screws are rotated; and a shaft attached to the piston head, the shaft extending from the barrel and retracting into the barrel according to direction of linear movement of the piston head, said auxiliary sleeve being mounted on the shaft.

13. The rotary actuator according to claim 12, wherein:

the drive screw having the drive gear attached thereto extends centrally through the base plate; and the drive screws having the driven gears attached thereto are radially spaced around the centrally disposed drive screw.

14. The rotary actuator according to claim 13, wherein the drive screw having the drive gear attached thereto and the drive screws having the driven gears attached thereto are threaded in opposite directions, whereby the gear train and direction of the drives screw threads cooperate to simultaneously drive the drive screw threads at identical speeds in the same direction.

15. The rotary actuator according to claim 14, wherein each of the nuts disposed in the sockets of the piston head end disks is floating in the corresponding socket to permit adjustment for thread tolerances and smooth rotation of the drive screws in the piston head.

\* \* \* \* \*